(12) United States Patent
Tentrup et al.

(10) Patent No.: US 10,184,792 B2
(45) Date of Patent: Jan. 22, 2019

(54) DEVICE AND METHOD FOR MEASURING AND DETERMINING RELEVANT PARAMETERS FOR THE ADJUSTMENT OF THE DIRECTIONS OF TRAVEL OF TWO STEERABLE AXLES OF A VEHICLE IN RELATION TO EACH OTHER

(71) Applicant: Dürr Assembly Products GmbH, Püttlingen (DE)

(72) Inventors: Thomas Tentrup, Merzig-Mechern (DE); Christoph Meyers, Losheim am See (DE)

( * ) Notice: Subject to any disclaimer, the term of this patent is extended or adjusted under 35 U.S.C. 154(b) by 42 days.

(21) Appl. No.: 14/911,039

(22) PCT Filed: Aug. 1, 2014

(86) PCT No.: PCT/DE2014/100282
§ 371 (c)(1),
(2) Date: May 31, 2016

(87) PCT Pub. No.: WO2015/018396
PCT Pub. Date: Feb. 12, 2015

(65) Prior Publication Data
US 2016/0298961 A1 Oct. 13, 2016

(30) Foreign Application Priority Data

Aug. 9, 2013 (DE) .................. 10 2013 108 682

(51) Int. Cl.
*G01B 21/26* (2006.01)
*G07C 5/08* (2006.01)

(52) U.S. Cl.
CPC ............ *G01B 21/26* (2013.01); *G07C 5/08* (2013.01); *G01B 2210/24* (2013.01)

(58) Field of Classification Search
CPC .... G01B 21/26; G01B 2210/24; G01B 21/22; G07C 5/08
See application file for complete search history.

(56) References Cited

U.S. PATENT DOCUMENTS 5,105,546 A    4/1992  Weise et al.
5,143,400 A    9/1992  Miller et al.
(Continued)

FOREIGN PATENT DOCUMENTS

DE        3622072 A1      1/1987
DE    102005042446 B3    11/2006
(Continued)

OTHER PUBLICATIONS

International Search Report of PCT/DE2014/100282 dated Oct. 29, 2014, 3 pages.

*Primary Examiner* — Bryan Bui
(74) *Attorney, Agent, or Firm* — Miller Canfield

(57) ABSTRACT

A device and method for determining parameters for adjusting the directions of travel of two steerable axles of a vehicle relative to each other is disclosed, wherein one measuring unit for measuring the individual toe angle of a vehicle wheel associated with the measuring unit is present on each side of the vehicle such that a first measuring unit is assigned to the wheel of the first of the steerable axles on the vehicle's left side and the second measuring unit is assigned to the wheel of the second of the steerable axles on the vehicle's right side, wherein the output signals from the measuring units are supplied to an evaluating unit, wherein the difference in the directions of travel of the two steerable axles is determined in the evaluating unit from the signals supplied from the measuring units and is provided as an output signal from the evaluating unit.

6 Claims, 2 Drawing Sheets

(56) References Cited

U.S. PATENT DOCUMENTS

| | | | |
|---|---|---|---|
| 5,417,299 | A | 5/1995 | Pillar et al. |
| 5,553,389 | A | 9/1996 | Winslow et al. |
| 5,675,515 | A | 10/1997 | January |
| 6,374,159 | B1 * | 4/2002 | Naruse .................. G01B 21/26 |
| | | | 33/203.15 |
| 2008/0273194 | A1 | 11/2008 | De Sloovere et al. |

FOREIGN PATENT DOCUMENTS

| | | |
|---|---|---|
| DE | 102006036671 A1 | 2/2008 |
| DE | 102008045307 A1 | 3/2010 |
| EP | 0895056 A2 | 3/1999 |

* cited by examiner

DEVICE AND METHOD FOR MEASURING AND DETERMINING RELEVANT PARAMETERS FOR THE ADJUSTMENT OF THE DIRECTIONS OF TRAVEL OF TWO STEERABLE AXLES OF A VEHICLE IN RELATION TO EACH OTHER

This application is a national filing of International Patent Application No. PCT/DE2014/100282 filed Aug. 1, 2014, which claims priority to German Patent Application No. DE102013108682.9 filed Aug. 9, 2013.

TECHNICAL FIELD

The present invention relates to a device and to a method for adjusting the direction of travel of two steerable vehicle axles relative to each other according to the preamble of the claims 1 and 5.

BACKGROUND

One of the aims of chassis alignment in vehicles with two steerable axles (A1, A2) is to ensure that the directions of travel of the steerable axles is consistent with the vehicle's axis of travel when the steering-wheel is in the horizontal position. Vehicles with two steerable axles include, for example, trucks used for the transport of heavyweight goods. The axis of travel is defined by the direction of travel of a rear axle. The vehicle's chassis geometry may be measured here with the device and the method disclosed in DE 10 2008 045 307 A1. By performing a chassis alignment and determining the vehicle's steering-wheel angle $\Omega$ (angular deviation of the steering wheel from the horizontal) for the two steerable axles A1 and A2, one obtains, as a function of the steering-wheel angle $\Omega$, the four individual toe angles relative to the vehicle's axis of travel: $SpA1_{left}(\Omega)$, $SpA1_{right}(\Omega)$, $SpA2_{left}(\Omega)$, $SpA2_{right}(\Omega)$.

From the two individual toe angles for each of the two steerable axles one obtains, as a function of the steering-wheel angle, the direction of travel $\delta A1$ of the axle A1 relative to the vehicle's axis of travel $$\delta A1(\Omega) = (SpA1_{left}(\Omega) - SpA1_{right}(\Omega))/2 \quad (1a)$$

and the direction of travel $\delta A2$ of the axle A2 relative to the vehicle's axis of travel $$\delta A2(\Omega) = (SpA2_{left}(\Omega) - SpA2_{right}(\Omega))/2 \quad (1b)$$

as well as the total toe GSpA1 of the axle A1

$$GSpA1 = SpA1_{left}(\Omega) + SpA1_{right}(\Omega) \quad (2a)$$

and the total toe GSpA2 of the axle A2

$$GSpA2 = SpA2_{left}(\Omega) + SpA2_{right}(\Omega) \quad (2b)$$

Prior to alignment, the two steerable axles (A1, A2) are in the following state:

$$\delta A1(\Omega) = (\Omega - \Delta\Omega)/\text{steering-wheel gear ratio} \quad (3)$$

where $\Delta\Omega$ is the angular deviation of the steering-wheel position from the horizontal (steering-wheel misalignment) when the vehicle is travelling straight ahead (i.e. when $\delta A1 = 0$) and $\delta A1 \neq \delta A2$, where $|\delta A1|$, $|\delta A1|$, $|\delta A2| \ll 5°$ applies on account of the vehicle's being driven straight ahead onto the test bay.

On condition that $|\delta A1|$, $|\delta A2| \ll 5°$, it follows that, for all the following calculations, the total toe angles GSpA1 and GSpA2 are not a function of the steering-wheel position $\Omega$. A further condition is that effects of steering-wheel play are ruled out by suitable measures (see DE 10 2005 042 446 B3) and that the steering wheel is centered and remains so for all alignments.

The two steerable front axles with the steering-wheel gear ratio (L/Üb) are correctly aligned when Alignment 1 leads to $\Delta\Omega = 0$ and thus to $\delta A1(\Omega) = /L\ddot{U}b$, where $\delta A1(\Omega) = 0$ for $\Omega = 0$, and Alignment 2 leads to $\delta A1(\Omega) = \delta A2(\Omega)$ and thus to $0 = \Delta = \delta A1(\Omega) - \delta A2(\Omega)$, where $\Delta$ is the difference in directions of travel of the steerable axles A1 and A2.

Alignments 1 and 2 are mutually independent, meaning that the sequence of the alignments 1 and 2 may also be exchanged, or alignment 1 carried out without alignment 2 and vice versa.

The total toe angles of the steerable axles A1 (GSpA1) and A2 (GSpA2) are constant under the general conditions set forth above (i.e. $|\delta A1|$, $|\delta A2| \ll 5°$) and are in keeping with the specified values in each case. In other words, the total toe angles do not change when alignments 1 and 2 are performed.

The alignment 1 may be performed, for example with the device and the method disclosed in DE 10 2008 045 307 A1, subsequent to chassis alignment.

To this end, the measuring units are positioned opposite the wheels of the steerable axle A1 and measurement is commenced. The mechanic sets the direction of travel $\delta A1$ to zero.

Subsequently, the steering wheel, with which a steering-wheel balance is connected for measuring the steering-wheel angle $\Omega$, is rotated against the steering column until the steering-wheel angle is also zero and the direction of travel $\delta A1$ remains at zero.

The disadvantage of the alignment 1 procedure is that during adjustment of the steering wheel by rotating it against the steering column, the mechanical coupling causes the direction of travel of the steerable axle $\delta A1$ to deviate from zero. The steerable axle's zero-degree position has to be restored and the steering wheel readjusted. This costs valuable cycle time.

On completion of alignment 1, the measuring units of the test bay disclosed in DE 10 2008 045 307 A1 may be positioned opposite the wheels of the steerable axle A2 and measurement commenced.

The mechanic zeroes the direction of travel $\delta A2$ of the second steerable axle A2 via the mechanical coupling between the two steerable axles. The direction of travel $\delta A1$ must remain zeroed while this is being done.

The disadvantage of this procedure for the alignment 2 is that the direction of travel of both steerable axles may change on account of the coupling, so that, following alignment of the second steerable axle, the direction of travel of the first steerable axle has to be checked once again and, if necessary, readjusted. This costs valuable cycle time.

The problem in the case of alignment 1 is that two magnitudes: the direction of travel $\delta A1$ of the first steerable axle and the steering-wheel angle $\Omega$ have to be zeroed separately.

The problem in the case of alignment 2 is the necessity of measuring the directions of travel of both steerable axles during the alignment 2 in order to ensure that the alignment is accurate.

Attention is drawn additionally to the following state of the art. DE 10 2006 036 671 A1 describes a method of determining a vehicle's axle geometry. A method is described in which lines of light are projected onto a wheel and analyzed to determine the wheel-plane orientation of this wheel.

U.S. Pat. No. 7,864,309 B2 describes a further embodiment of a method of this kind, in which not only separate points on the illumination lines are evaluated but in which, to start with, the course of a curve is determined, which represents the course of the individual lines analyzed. U.S. Pat. No. 5,675,515 describes a procedure in which the wheel plane is measured by mounting targets on the wheel whose wheel plane is to be determined EP 895 056 A2 describes a procedure in which, to determine a vehicle's chassis geometry parameters, a measuring system is assigned to each of the vehicle's wheels. U.S. Pat. No. 5,143,400 describes a procedure in which changes in the static or dynamic load distribution of a moving vehicle, as well as their influence on the toe angle, are compensated for. The intention here is to ensure that the chassis conforms to the Ackermann steering principle.

SUMMARY

The object of the present invention is to enable measuring and alignment work to be performed quickly and efficiently.

This object is established according to the present invention, as set forth in claim 1, by a device for measuring and determining relevant parameters for adjusting the directions of travel ($\delta A1$, $\delta A2$) of two steerable axles (A1, A2) of a vehicle relative to each other. Only one measuring unit for measuring the individual toe angle ($SpA1_{left}$, $SpA2_{right}$) of a vehicle wheel associated with said measuring unit is present on each side of the vehicle. A first measuring unit is assigned to the wheel of the first of the steerable axles (A1, A2) on the vehicle's left hand side. The second measuring unit is assigned to the wheel of the second of the steerable axles on the vehicle's right hand side. The output signals from the measuring units are supplied to an evaluating unit. The difference $\Delta$ in the directions of travel ($\delta A1$, $\delta A2$) of the two steerable axles (A1, A2), or a parameter representing said difference $\Delta$, is determined in the evaluating unit from the signals supplied from the measuring units and is provided as an output signal from the evaluating unit.

This output signal may be processed in various ways and put to further use. Corresponding embodiments are described in the following claims.

It is to advantage in this embodiment that alignment work can be performed quickly and efficiently although only two measuring units are required for the measurements.

In the embodiment of the device according to claim 2, the output signal from the evaluating unit is supplied to a visual display unit and displayed there.

In this embodiment, the visual display unit is advantageously located where it can be seen by a mechanic carrying out the alignment work. The mechanic may perform the alignment work in such a way that the indicated difference $\Delta$, or the parameter representing this difference $\Delta$, is reduced to zero. The parameter representing the difference $\Delta$ may, for example, be configured such that the mechanic is only shown the direction in which he needs to move an adjusting means (and perhaps, additionally, whether the required adjustment is comparatively large or small). This may be effected, for example, by displaying an arrow whose direction indicates the direction in which the adjusting means needs to be moved and whose length and/or thickness indicates whether a large or a comparatively small adjustment is necessary.

Alternatively, or in addition to the display in the embodiment of the device according to claim 2, the output signal from the evaluating unit may, as set forth in claim 3, be supplied to an automatic adjusting unit. This automatic adjusting unit interacts operatively with adjusting means of the coupling of the directions of travel ($\delta A1$, $\delta A2$) of the two steerable axles (A1, A2) relative to each other. The automatic adjusting unit is configured such that it acts on the adjusting means, as a function of the output signal from the evaluating unit, in such a way that the difference $\Delta$, or the parameter representing this difference $\Delta$, becomes zero.

The alignment work is performed automatically by way of this embodiment.

The automatic adjusting unit may be configured such that a signal representing the difference $\Delta$ in the directions of travel of the two steerable axles is supplied to it from the evaluating unit. In this case, the automatic adjusting unit itself has a computing unit to determine, on the basis of this signal, how the automatic adjusting unit must act on the adjusting means of the coupling between the two steerable axles in order to reduce the difference $\Delta$ to an absolute value smaller than a threshold value.

The interface between the evaluating unit and the automatic adjusting unit may also be defined such that the way in which the automatic adjusting unit must act on the adjusting means of the coupling between the two steerable axles is determined completely in the evaluating unit. In this case, the automatic adjusting unit merely carries out the "adjusting command" supplied to it from the evaluating unit.

Claim 4 describes a device which also enables the steering wheel to be adjusted easily and effectively relative to the steering column in such a way that said steering wheel is in the horizontal position when the direction of travel $\delta A1$ of the steerable axle, which is coupled with the steering column, is zero (i.e. when the vehicle is travelling straight ahead). This has previously been termed "alignment 1".

In an advantageous refinement of the previously known procedure for performing the alignment 1, the device of the embodiment according to claim 4 also has a measuring system for registering the position of the steering wheel. A corresponding signal from the measuring system is supplied to an evaluating system. A measuring device for registering the direction of travel $\delta A1$ of at least one of the vehicle's steerable axles (axle A1) is also provided. The measuring device supplies a signal representing the direction of travel $\delta A1$ of the at least one steerable axle A1 to the evaluating system. The evaluating system is set up in such a way that, from the signals supplied to it from the measuring system and the measuring device and taking the vehicle's steering-wheel gear ratio LÜb into account, it determines and outputs a parameter corresponding to an angle by which, under the existing circumstances, the steering wheel must be rotated relative to the steering column in order that, once the steering wheel has been fully adjusted, the steering-wheel angle ($\Omega$) is zero when the direction of travel $\Delta A1$ of the at least one steerable axle A1 is zero.

This means that, with the described arrangement of claim 4, it is no longer necessary to first set the direction of travel $\delta A1$ to zero in order to adjust the steering wheel. In the embodiment according to claim 4, by contrast, a correction parameter is determined by which the steering wheel must be rotated relative to the steering column, starting from the current position, in order that the steering wheel is in the "horizontal position" when the vehicle is travelling straight ahead.

Thus, in the embodiment according to claim 4, it is neither necessary to set the direction of travel $\delta A1$ of the steerable axle A1 to zero nor is it necessary to zero the steering-wheel angle.

Hitherto it has been necessary first to set the direction of travel $\square A1$ of the vehicle's steerable axle A1 to zero in order to then rotate the steering wheel relative to the steering column until the steering wheel is in the horizontal position. This costs valuable cycle time on account of the necessity of first setting the direction of travel δA1 to zero.

In the embodiment according to claim 4, a parameter based on the current steering-wheel position is generated, which, in cases where the steerable axle A1 has a direction of travel δA1≠0, makes it possible to position the steering wheel in such manner relative to the steering column that the thus-positioned steering wheel is in the horizontal position when δA1=0.

To implement the overall context described above, therefore, the steering-wheel misalignment ΔΩ is determined from the direction of travel δA1 of the first steerable axle as measured with the measuring device and from the steering-wheel angle Ω as measured with a steering-wheel balance connected to the steering wheel. The steering-wheel balance is described, for example, in German patent DE 10 2008 045 307 A1. The measuring device may consist, for example, of the two measuring units 1 and 2, each of which is positioned opposite a wheel of a steerable axle. This may be the steerable axle A1.

The relation between the direction of travel of the steerable axle (here the first axle A1, so δA1), the steering-wheel gear ratio LÜb, the steering-wheel angle Ω and the steering-wheel misalignment derives from the formula (3):

$$\Delta\Omega = \Omega - L\ddot{U}b * \delta A1 \qquad (6)$$

Formula (6) shows that, for the purpose of adjusting the position of the steering-wheel by rotating it relative to the steering column, the current steering-wheel misalignment ΔΩ can always be output in the form of a parameter, irrespective of the value of the first steerable axle's direction of travel, and then adjusted to zero. Knowledge of the vehicle's steering-wheel gear ratio LÜb is a prerequisite here.

The parameter is output in this case as a "correction angle" by which the steering wheel must be rotated from its current position relative to the steering column.

It must be noted in this context that the steering wheel cannot be rotated continuously by arbitrary angles relative to the steering column but only incrementally, in steps of a few degrees at a time. The number of steps and the direction in which the steering wheel must be rotated relative to the steering column (based on the current position of the steering wheel relative to the steering column) may therefore be output as parameters. The number of steps and the rotational direction are determined such that the difference (as an absolute value) from the steering-wheel misalignment ΔΩ actually ascertained is minimized. As the steering wheel can only be adjusted incrementally and not continuously, a small difference will remain in most cases. It must also be remembered to keep the steering wheel centered during this adjustment.

The object of the invention is furthermore established by a method as set forth in claim 5, according to which the directions of travel (δA1, δA2) of two steerable axles (A1, A2) of a vehicle are adjusted relative to each other by means of only one measuring unit per vehicle side. To this end, the difference (Δ) in the directions of travel (δA1, δA2) of the two steerable axles (A1, A2), or a parameter representing said difference (Δ), is determined from a measurement of the toe angle ($SpA1_{left}$) of the left-hand wheel of a first of the two axles (A1) and the measurement of the toe angle ($SpA2_{right}$) of the right-hand wheel of the second axle (A2). The directions of travel (δA1, δA2) of the two steerable axles (A1, A2) are mutually aligned in such a way that the difference (Δ), or the parameter representing this difference (Δ), is smaller in magnitude than a threshold value.

This method describes how the alignment may be performed at low equipment cost.

It is apparent that the references to the "left-hand wheel" and the "right-hand wheel" and the names of the steerable axles (A1 and A2) in the aforegoing claims are interchangeable. It is therefore optional whether, to start with, measurements commence on the left-hand wheel or the right-hand wheel of the further forward of the two steerable axles. The main condition for the measuring and alignment work is that measurements concerning the further rearward of the two steerable axles may only be performed on the wheel on the opposite side of the vehicle.

An advantageous opportunity is thus provided for performing alignment work requiring only one measuring unit per side for measuring the wheel toe angle, the camber angle and the coordinates of the wheel centers of a chassis rig. The measurements are described, for example, in DE 10 2008 045 307 A1.

The advantage of the invention consists in performing this alignment work efficiently with only one measuring unit per vehicle side after carrying out the alignment 1.

The difference Δ in the directions of travel δA1(Ω) and δA2(Ω) is given by:

$$\Delta = \delta A1(\Omega) - \delta A2(\Omega) \qquad (4)$$

By inserting the formulae (1a,b) and (2a,b) in (3) one obtains:

$$\Delta = \delta A1(\Omega) - \delta A2(\Omega) = SpA1_{left}(\Omega) + SpA2_{right}(\Omega) - (GSpA1 + GSpA2)/2 \qquad (5a)$$

or $$\Delta = \delta A1(\Omega) - \delta A2(\Omega) = (GSpA1 + GSpA2)/2 - SpA1_{right}(\Omega) - SpA2_{left}(\Omega) \qquad (5b)$$

For the alignment 2—preferably performed after the alignment 1 has been carried out—one measuring unit is left on the left-hand side, opposite the left-hand wheel of the steerable axle 1. The other measuring unit is positioned on the right-hand side, opposite the right-hand wheel of the steerable axle 2. It is clearly of no consequence which of the two steerable axles are assigned the number 1 and which the number 2. Accordingly, it is equally possible to leave one measuring unit on the right-hand side, opposite the right-hand wheel of the steerable axle 1, and to position the other measuring unit on the left-hand side, opposite the left-hand wheel of the steerable axle 2.

Measurement of the difference Δ in directions of travel is then commenced and the mechanic adjusts it to zero via the mechanical coupling.

Claim 6 relates to a refinement of the method according to claim 5. In the method according to claim 6, the position of the steering wheel (steering-wheel angle Ω) is also determined. From the direction of travel δA1 of at least one of the steerable axles (A1), the position of the steering wheel and from the vehicle's steering-wheel gear ratio LÜb, a parameter is determined and output that corresponds to an angle (ΔΩ) by which, under the existing circumstances, the steering wheel must be rotated relative to the steering column in order that, once the steering wheel has been fully adjusted, the steering-wheel angle (Ω) is zero when the direction of travel δA1 of the steerable axle is zero.

This method can be carried out with the features making up the subject matter of device claim 4.

It is evident that the device according to claim 4 and the method according to claim 6 can be used not only in connection with aligning the directions of travel of two steerable axles but that this device and also the method for adjusting the steering-wheel angle can also be used in a different procedure for aligning the directions of travel of two steerable axles. It is also evident that a device of this kind and a method of this kind can also be used for a vehicle that has only one steerable axle. The advantage of the embodiment according to the claims 4 and 6, namely that it is not necessary to first zero the direction of travel δA of the steerable axle in order to adjust the steering wheel, applies equally to a vehicle with just one steerable axle. We therefore expressly reserve the right to pursue this aspect as independent claims in a separate divisional application. This then applies irrespective of whether the vehicle is configured with one or two steerable axles and irrespective of how the vehicle parameters are adjusted on the one or more axles.

DETAILED DESCRIPTION

Figure 1:
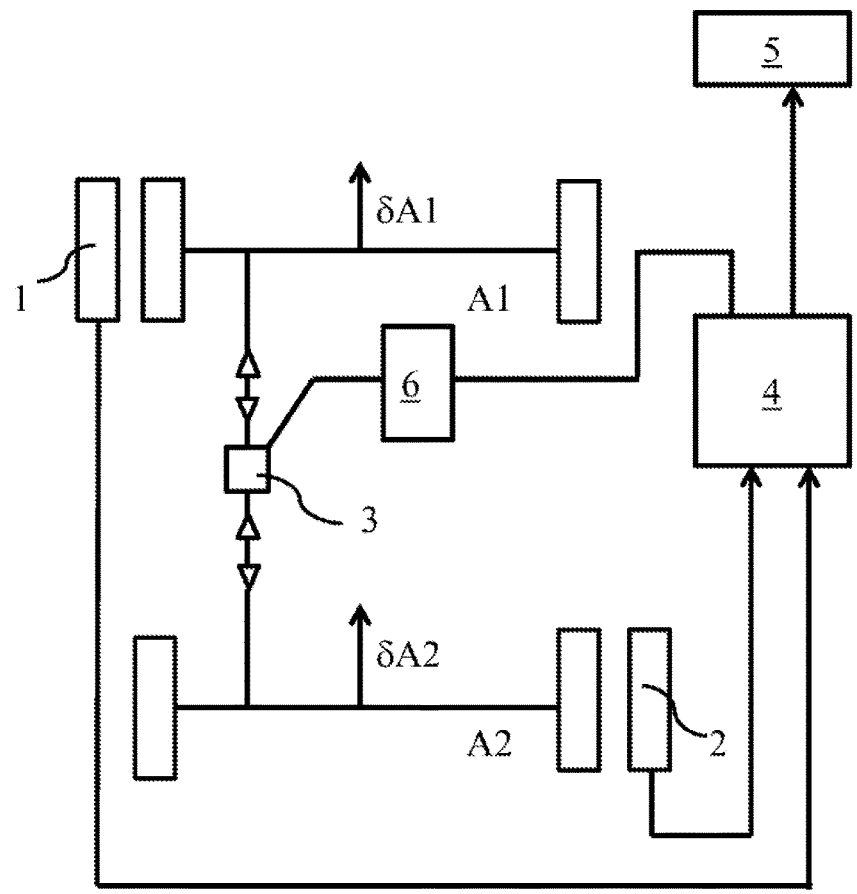
FIG. 1: shows a first device for aligning the directions of travel of two steerable axles

FIG. 1 shows two measuring units designated 1 and 2, each of which is assigned to one of the vehicle's wheels. It can be seen that these measuring units are assigned to wheels on different steerable axles A1 and A2, on different sides of the vehicle.

Each of these measuring units 1 and 2 measures the toe angle of the wheel to which it is assigned.

Reference numeral 3 designates an adjusting means for mutually aligning the directions of travel δA1 and δA2 of the two steerable axles A1 and A2.

On condition that the total toe angles GSpA1 and GSpA2 of the axles A1 and A2 remain unchanged during the alignment, or that changes in the total toe angles are negligible, it follows from the above derivation that, from a measurement of the toe angle $SpA1_{left}$ and a measurement of the toe angle $SpA2_{right}$, alignment can be effected in such a way that the value Δ is a smaller absolute value than a threshold value.

On the basis of this finding, the output signals from the measuring units 1 and 2 are supplied to an evaluating unit 4, which is configured in such a way that the value Δ, or a parameter representing this value Δ, is determined in the evaluating unit. To this end, the evaluating unit 4 has two input ports via which the output signals from the measuring units 1 and 2 are supplied to the evaluating unit 4. The evaluating unit 4 may be a computer that is appropriately programmed such that—based on the above derivation—the value Δ or a parameter representing this value is determined from these input variables.

A visual display unit 5 is also visible, which displays the output signal from the evaluating unit 4, i.e. the value Δ or a parameter representing this value.

The visual display unit enables the value Δ, or a parameter representing this value Δ, to be displayed while the alignment work is being performed.

During the alignment work, the directions of travel δA1 and δA2 of the two steerable axles A1 and A2 are mutually aligned. For as long as alignment work is being performed, therefore, the value Δ or the parameter representing this value Δ changes. Since this variable is displayed by the visual display unit 5, the mechanic can undertake the alignment work in such a way that the value Δ, or the parameter representing this value Δ, is a smaller absolute value than a threshold value and is, in the best of cases, zero.

As an alternative to supplying the output signal from the evaluating unit 4 to a visual display unit 5, this output signal may also be supplied to an automatic adjusting unit 6. This automatic adjusting unit 6 may be configured such that, depending on the output signal supplied to it from the evaluating unit 4, it influences the adjusting means 3 in such a way that the value Δ, or a parameter representing this value Δ, becomes zero.

In this case too (as shown in FIG. 1), the output signal from the evaluating unit 4 may be additionally supplied to a visual display unit 5. The automated alignment process can then also be monitored optically via the visual display unit 5.

Figure 2:
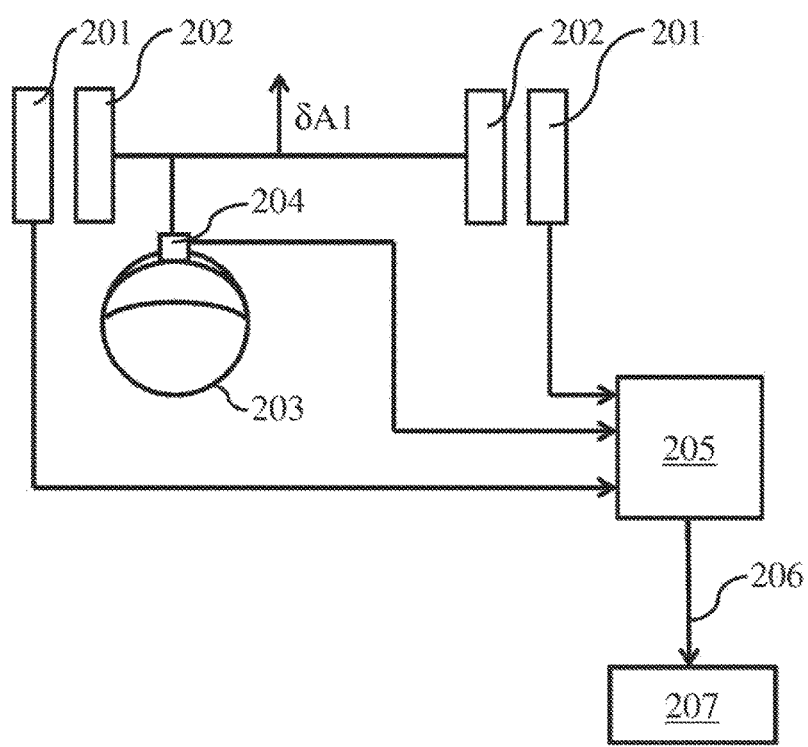
FIG. 2: shows a further device for performing steering-wheel adjustments.

FIG. 2 shows the alternative configuration for the "alignment 1" according to claims 5 and 6 of this invention. It shows a steerable vehicle axle with two wheels 202.

A measuring device 201 for determining the direction of travel δA1 of the steerable axle is assigned to these wheels 202. The measuring device 201 may correspond, for example, to the measuring units 1 and 2 shown in FIG. 1. The output signals from the measuring device 201 are supplied to an evaluating system 205.

A steering wheel is also visible, to which a measuring unit 204 is assigned. This measuring unit 204 may be configured, for example, according to DE 10 2008 045 307 A1. The output signal(s) from the measuring unit 204 is/are also supplied to the evaluating system 205.

In the evaluating system 205, a parameter corresponding to the steering-wheel misalignment ΔΩ is determined from the signals supplied to it and from the vehicle's steering-wheel gear ratio LÜb.

This parameter may be the steering-wheel misalignment ΔΩ direct (in amount and angular orientation) or it may be a parameter of the type alluded to in claim 5, for example, relating to the incremental adjustability of the steering wheel relative to the steering column.

This parameter may be displayed as an output signal 206 on a visual display unit 207.

It is also apparent from the context of what is shown in FIG. 2 that adjustment of the steering wheel with the procedure shown is independent of the procedure for adjusting vehicle parameters on the vehicle axle.

The invention claimed is:

1. A device for measuring and determining relevant parameters for adjusting the directions of travel (δA1, δA2) of two steerable axles (A1, A2) of a vehicle relative to each other, whereby the adjustment of the direction of travel (δA1, δA2) of both steerable axles (A1, A2) is part of the adjustment of the parameters of the chassis alignment of the car and whereby the both steerable axles (A1, A2) are coupled mechanically, characterized in that only one measuring unit (1, 2) for measuring the individual toe angle ($SpA1_{left}$, $SpA2_{right}$) of a wheel associated with said measuring unit (1, 2) is present on each side of the vehicle in such a way that a first measuring unit (1) is assigned to the wheel of the first of B the steerable axles (A1, A2) on the vehicle's left hand side and that a second measuring unit (2) is assigned to the wheel of the second of the steerable axles (A2, A1) on the vehicle's right-hand side, the difference Δ in the directions of travel (δA1, δA2) of the two steerable axles (A1, A2), or a parameter representing this difference Δ, being determined in an evaluating unit (4) from the signals supplied from the measuring units (1, 2) and being provided as an output signal from the evaluating unit (4).

2. The device of claim 1, characterized in that the output signal from the evaluating unit (4) is supplied to a visual display unit (5) and displayed there.

3. The device according to claim 1, characterized in that the output signal from the evaluating unit (4) is supplied to an automatic adjusting unit (6) that interacts operatively with adjusting means (3) of the coupling of the directions of travel (δA1, δA2) of the two steerable axles (A1, A2) relative to each other, the automatic adjusting unit (6) being configured such that it acts on the adjusting means (3), as a function of the output signal from the evaluating unit (4), in such a way that the difference Δ, or the parameter representing this difference Δ, becomes zero.

4. The device according to claim 1, characterized in that the device also has a measuring system (204) for registering the position of the steering wheel (203) with a steering-wheel angle (Ω), that, in addition, a measuring device (201) is provided for measuring the direction of travel (δA1) of at least one of a vehicle's steerable axles (A1), that a corresponding signal is supplied from the measuring system (204) to an evaluating system (205), that the evaluating system (205) is also supplied, from the measuring device (201), with a signal representing the direction of travel (δA1) of the at least one steerable axle (A1), that the evaluating system (205) is set up in such a way that, from the signals supplied to it from the measuring system (204) and the measuring device (201), taking the vehicle's steering-wheel gear ratio (LÜb) into account, it determines and outputs a parameter (206) corresponding to an angle (ΔΩ) by which, under the existing circumstances, the steering wheel (203) must be rotated relative to the steering column in order that, once the steering wheel (203) has been fully adjusted, the steering-wheel angle (Ω) is zero when the direction of travel (δA1) of the steerable axle is zero.

5. A method for measuring and determining relevant parameters for adjusting the directions of travel (δA1, δA2) of two steerable axles (A1, A2) of a vehicle relative to each other, whereby the adjustment of the direction of travel (δA1, δA2) of both steerable axles (A1, A2) is part of the adjustment of the parameters of the chassis alignment of the car and whereby the both steerable axles (A1, A2) are coupled mechanically, characterized in that the directions of travel (δA1, δA2) of the two steerable axles (A1, A2) are adjusted relative to each other by means of only measuring unit (1, 2) per vehicle side by determining the difference (Δ) in the directions of travel (δA1, δA2) of the two steerable axles (A1, A2), or a parameter representing this difference (Δ), from a measurement of the toe angle ($SpA1_{left}$) of the left-hand wheel of a first axle (A1) and the measurement of the toe angle ($SpA2_{right}$) of the right-hand wheel of the second axle (A2), mutual alignment of the directions of travel (δA1, δA2) of the two steerable axles (A1, A2) being performed in such a way that the difference (Δ), or the parameter representing this difference (Δ), becomes a smaller absolute value than a threshold value.

6. The method according to claim 5, characterized in that, in addition, the position of the steering wheel (203) with a steering-wheel angle (Ω) is registered, that the direction of travel (δA1) of at least one of the vehicle's steerable axles (A1) is measured and that, from the position of the steering wheel (203), the measured direction of travel (δA1) and the vehicle's steering-wheel gear ratio (LÜb), a parameter (206) is determined and output that corresponds to an angle (ΔΩ) by which, under the existing circumstances, the steering wheel (203) must be rotated relative to the steering column in order that, once the steering wheel (203) has been fully adjusted, the steering-wheel angle (Ω) is zero when the direction of travel (δA1) of the steerable axle is zero.

* * * * *